(12) United States Patent
Sotoike

(10) Patent No.: US 9,623,329 B2
(45) Date of Patent: Apr. 18, 2017

(54) OPERATIONS FOR SELECTING AND CHANGING A NUMBER OF SELECTED OBJECTS

(71) Applicant: NINTENDO CO., LTD., Kyoto (JP)

(72) Inventor: Hiroki Sotoike, Kyoto (JP)

(73) Assignee: NINTENDO CO., LTD., Kyoto (JP)

( * ) Notice: Subject to any disclaimer, the term of this patent is extended or adjusted under 35 U.S.C. 154(b) by 668 days.

(21) Appl. No.: 13/845,757

(22) Filed: Mar. 18, 2013

(65) Prior Publication Data

US 2013/0290884 A1 Oct. 31, 2013

(30) Foreign Application Priority Data

Apr. 26, 2012 (JP) ................................ 2012-101464

(51) Int. Cl.
| | | |
|---|---|---|
| G06F 3/0484 | (2013.01) | |
| G06F 3/0488 | (2013.01) | |
| G06F 3/0481 | (2013.01) | |
| A63F 13/42 | (2014.01) | |
| A63F 13/2145 | (2014.01) | |
| A63F 13/20 | (2014.01) | |
| A63F 13/06 | (2006.01) | |

(52) U.S. Cl.
CPC .............. *A63F 13/42* (2014.09); *A63F 13/06* (2013.01); *A63F 13/2145* (2014.09); *G06F 3/0481* (2013.01); *G06F 3/0488* (2013.01); *G06F 3/04842* (2013.01); *A63F 2300/1075* (2013.01); *A63F 2300/204* (2013.01); *A63F 2300/6045* (2013.01)

(58) Field of Classification Search
CPC .. G06F 3/04842; G06F 3/0481; G06F 3/0488; A63F 13/06; A63F 2300/1075; A63F 2300/204
See application file for complete search history.

(56) References Cited

U.S. PATENT DOCUMENTS 5,754,179 A * 5/1998 Hocker ................. G06F 3/0481
715/835
6,243,724 B1 * 6/2001 Mander ................. G06F 3/0483
707/E17.008

(Continued)

FOREIGN PATENT DOCUMENTS

JP 2000-075977 3/2000
JP 2005-322088 11/2005

(Continued)

OTHER PUBLICATIONS

An English-language abstract and English-language machine translation of JP 2000-075977.

(Continued)

*Primary Examiner* — Amy M Levy
(74) *Attorney, Agent, or Firm* — Nixon & Vanderhye PC

(57) ABSTRACT

In an example information processing apparatus including a screen on which one or more objects are displayed and a pointing device for designating a given position on the screen, at least one object is designated by the pointing device. Further, an input state regarding the designation of the at least one object is detected, and the number of the at least one selected object is changed in accordance with the input state. Then, a predetermined process is performed on the at least one selected object.

21 Claims, 8 Drawing Sheets

(56) References Cited

U.S. PATENT DOCUMENTS

| | | | |
|---|---|---|---|
| 8,760,418 B2* | 6/2014 | Miyazawa | G06F 1/1643 178/18.06 |
| 2001/0024195 A1* | 9/2001 | Hayakawa | G06F 3/04847 345/173 |
| 2005/0240880 A1* | 10/2005 | Banks | G06F 3/04817 715/836 |
| 2005/0246664 A1* | 11/2005 | Michelman | G06F 3/04842 715/856 |
| 2006/0101354 A1* | 5/2006 | Hashimoto | G06F 3/04845 715/863 |
| 2006/0161868 A1* | 7/2006 | Van Dok | G06F 3/0481 715/835 |
| 2006/0238498 A1* | 10/2006 | Kando | G06F 3/04883 345/156 |
| 2008/0229256 A1* | 9/2008 | Shibaike | G06F 3/0488 715/863 |
| 2009/0150775 A1* | 6/2009 | Miyazaki | G06F 3/041 715/702 |
| 2009/0278806 A1* | 11/2009 | Duarte | G06F 3/0416 345/173 |
| 2009/0307623 A1* | 12/2009 | Agarawala | G06F 3/0483 715/765 |
| 2010/0026647 A1* | 2/2010 | Abe | G06F 3/04883 345/173 |
| 2010/0083111 A1* | 4/2010 | de los Reyes | G06F 3/0482 715/702 |
| 2010/0185977 A1* | 7/2010 | Ito | A63F 13/10 715/790 |
| 2011/0163970 A1* | 7/2011 | Lemay | G06F 3/04883 345/173 |
| 2011/0167384 A1* | 7/2011 | Yabu | G06F 3/0481 715/810 |
| 2011/0239145 A1* | 9/2011 | Kim | G06F 3/04842 715/765 |
| 2012/0079382 A1* | 3/2012 | Swenson | G11B 27/105 715/716 |

FOREIGN PATENT DOCUMENTS

| | | |
|---|---|---|
| JP | 2010-020608 | 1/2010 |
| JP | 2011-123779 | 6/2011 |

OTHER PUBLICATIONS

An English-language abstract and English-language machine translation of JP 2005-322088.

An English-language abstract and English-language machine translation of JP 2011-123779.

* cited by examiner

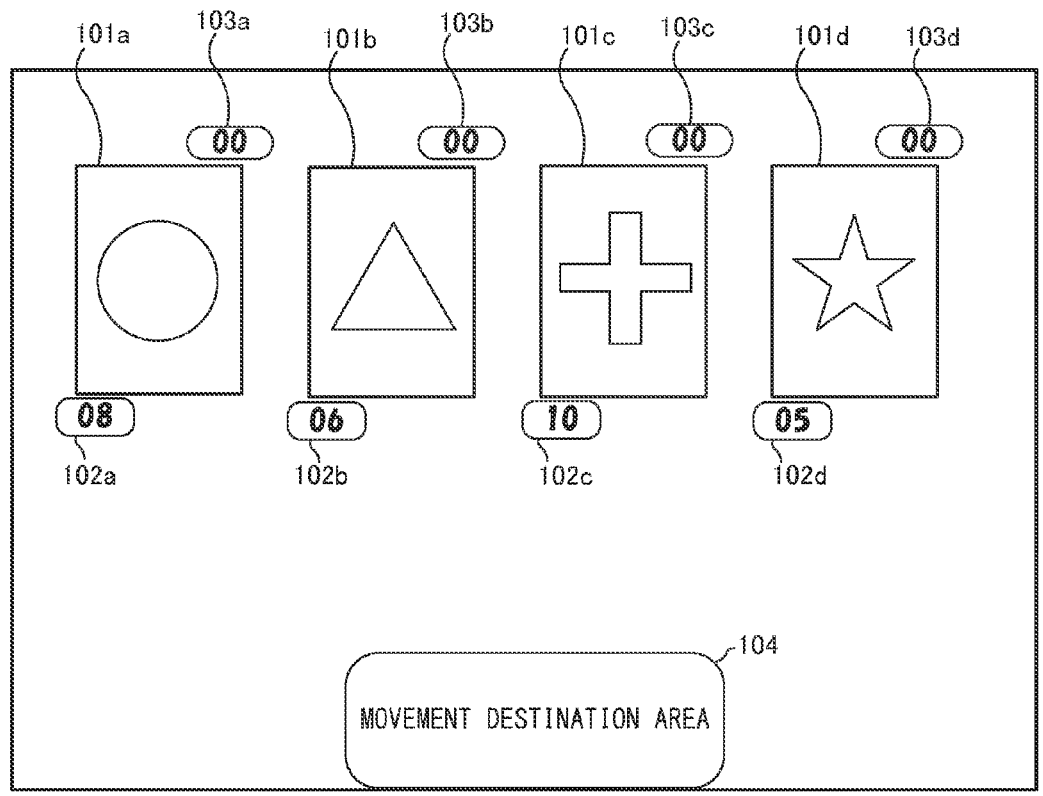
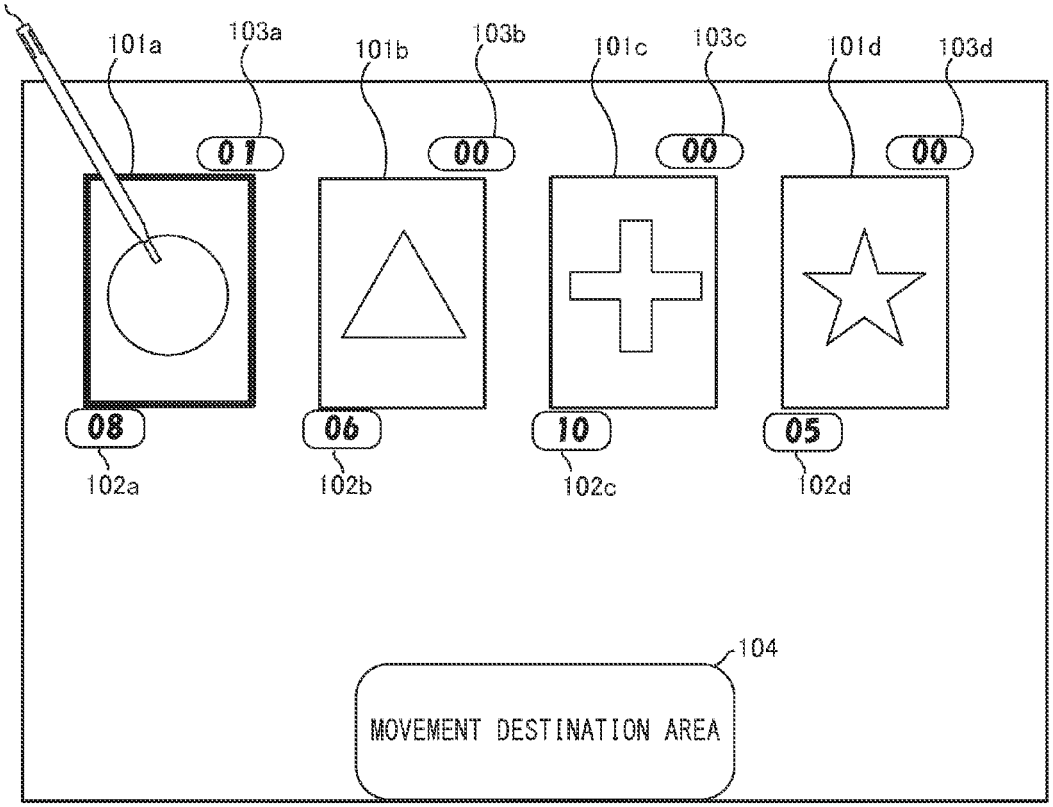

FIG. 8
WHEN TWO CARDS ARE SELECTED
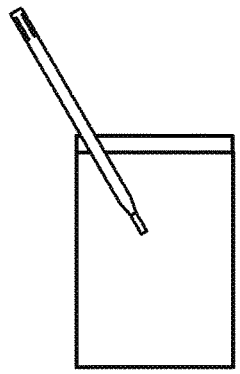
WHEN THREE CARDS ARE SELECTED
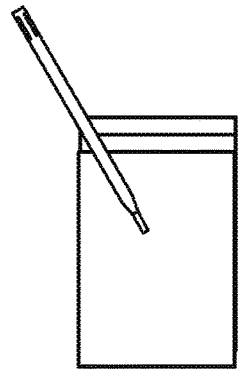
WHEN FOUR CARDS ARE SELECTED
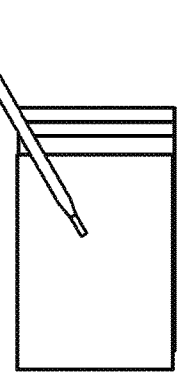
FIG. 9
WHEN TWO CARDS ARE SELECTED
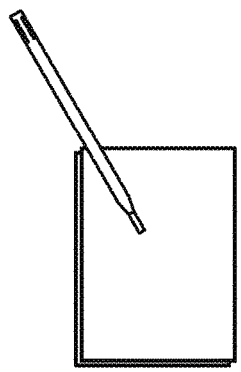
WHEN THREE CARDS ARE SELECTED
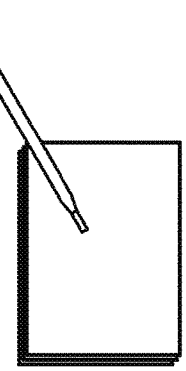
WHEN FOUR CARDS ARE SELECTED
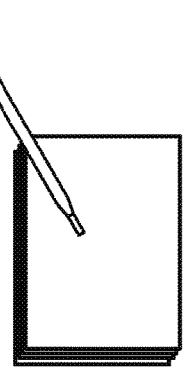

OPERATIONS FOR SELECTING AND CHANGING A NUMBER OF SELECTED OBJECTS

CROSS REFERENCE TO RELATED APPLICATION

The disclosure of Japanese Patent Application No. 2012-101464, filed on Apr. 26, 2012, is incorporated herein by reference.

FIELD

The present embodiment relates an object selection process, and more specifically, to a control to be performed when a plurality of objects are selected and a predetermined process is performed.

BACKGROUND AND SUMMARY

Conventionally, there has been known an information displaying apparatus having a function of changing a range for selecting objects displayed on a screen. For example, a technology has been known in which when a user performs a touch input on a touch panel, a range for selecting objects displayed on a screen is changed in accordance with a time period of the input performed by the user. In this technology, when the user performs a touch input in a short duration, objects included in a small range around the position of the touch input are selected; and when the user performs a touch input in a long duration, objects included in a large range are selected.

However, with the technology described above, the selection range needs to be enlarged in order to select a large number of objects. In other words, when the number of objects to be selected is increased, the space (space needed to enlarge the selection range) for displaying the objects needs to be enlarged. Therefore, the above technology is not suitable for a screen having a small resolution such as a mobile phone, in terms of visibility, operability, and the like.

Therefore, a main object of this embodiment is to provide an information processing program, an information processing apparatus, an information processing system, and an information processing control method that can realize a new selection operation.

Further, another object of this embodiment is to provide an information processing program, an information processing apparatus, an information processing method, and an information processing system that allow selection of a plurality of objects in a small display space.

In order to attain the above objects, the following configuration examples can be employed, for example.

A non-limiting example configuration causes a computer of an information processing apparatus, which includes a screen on which one or more objects are displayed and a pointing device for designating a given position on the screen, to function as a designation determination section, an object selection section, an input state detection section, a selection number changing section, and an object processing section. The designation determination section is configured to determine whether a designation of at least one object has been performed by the pointing device. The object selection section is configured to select the at least one object when the designation determination section has determined that the designation of the at least one object has been performed. The input state detection section is configured to detect an input state regarding the designation of the at least one object. The selection number changing section is configured to change the number of the at least one selected object in accordance with the detected input state. The object processing section is configured to perform a predetermined process on the at least one selected object.

According to the above configuration example, it is possible to provide an operation of selecting a large number of objects without taking a large display space on the screen, and of performing a predetermined process on the objects.

In another configuration example, the input state detection section may detect, as the input state, a time period during which the designation of the at least one object is continuously performed, and the selection number changing section may change the number of the at least one selected object in accordance with the time period during which the designation of the at least one object is continuously performed.

According to the above configuration example, the number of selected objects can be changed in accordance with the duration of the designation. Thus, an intuitive operation can be provided.

Further, as another configuration example, the selection number changing section may change the number of the at least one selected object so as to be increased in accordance with an increase in a time period detected by the input state detection section.

According to the above configuration example, the number of selected objects is increased, for example, in proportion to the time period during which the designation of the at least one object is continuously performed. Thus, it is possible to select objects through an intuitive operation.

Further, as another configuration example, the input state detection section may detect, as the input state, a designated position at which the designation of the at least one object is continuously performed, and the selection number changing section may repeatedly change the number of the at least one selected object while the designated position is included in a predetermined area, and stop changing the number of the at least one selected object while the designated position is not included in the predetermined area.

According to the above configuration example, the number of selected objects can be changed depending on whether the position at which the objects are designated is within a predetermined range, and thus, an intuitive selection operation can be provided.

Further, as another configuration example, the input state detection section may include a determination section configured to determine whether a predetermined condition is satisfied after the input state has become a state where the designation of the at least one object is continuously performed, and the object processing section may perform a predetermined process on the at least one selected object when the determination section has determined that the predetermined condition is satisfied.

According to the above configuration example, a predetermined process can be performed, for example, by simply performing a drag operation to a predetermined position after the number of selected objects has reached a desired number.

Further, as another configuration example, the determination section may determine whether the input state has changed from the state where the designation of the at least one object is continuously performed to a state where there is no input in a predetermined movement destination area, and when the input state detection section has determined that the input state has changed into the state where there is no input in the movement destination area, the object processing section may move the at least one selected object to the movement destination area.

According to the above configuration example, when the number of selected objects has reached a desired number, by performing a drag operation to a predetermined position shown as a movement destination area and then performing a touch-off, the moving process can be completed. Thus, selecting a plurality of objects and moving them can be performed through a series of operations.

Further, as another configuration example, the computer may be caused to function as a selection number information displaying section configured to display information indicating the number of the at least one selected object.

Further, as another configuration example, the selection number information displaying section may display the information indicating the number of the at least one selected object near the at least one selected object.

According to the above configuration example, the number of selected objects can be intuitively understood through display of the number of selected objects.

Further, as another configuration example, the computer may be caused to function as an object arranging section configured to arrange, among the objects, objects not having a predetermined relationship, along a longitudinal and/or lateral direction, and the designation determination section may determine whether a designation of objects has been performed by selecting them from among the objects arranged by the object arranging section along the longitudinal and/or lateral direction, and the selection number changing section may change the number of the at least one selected object that has the predetermined relationship with the objects selected from among the objects arranged by the object arranging section.

According to the above configuration example, among a plurality of object, objects not having a predetermined relationship can be arranged along the longitudinal and/or lateral direction, and, for example, objects having the predetermined relationship can be arranged so as to overlie one another in the depth direction. Thus, a plurality of objects can be arranged in accordance with relationship among them. Further, from the plurality of sorted objects, objects having a predetermined relationship can be selected, and the number of selected objects can be changed.

According to the present embodiment, it is possible to select a large number of objects and to perform a predetermined process on the selected objects, while saving the display space on the screen, and thus, it is possible to provide a comfortable operability.

BRIEF DESCRIPTION OF THE DRAWINGS

FIG. 2 shows a non-limiting example of an outline of processing of the present embodiment;

FIG. 3 shows a non-limiting example of an outline of processing of the present embodiment;

FIG. 8 shows a non-limiting example of an outline of processing of the present embodiment;

FIG. 9 shows a non-limiting example of an outline of processing of the present embodiment;

DETAILED DESCRIPTION OF NON-LIMITING EXAMPLE EMBODIMENTS

Hereinafter, the present embodiment will be described.

Figure 1:
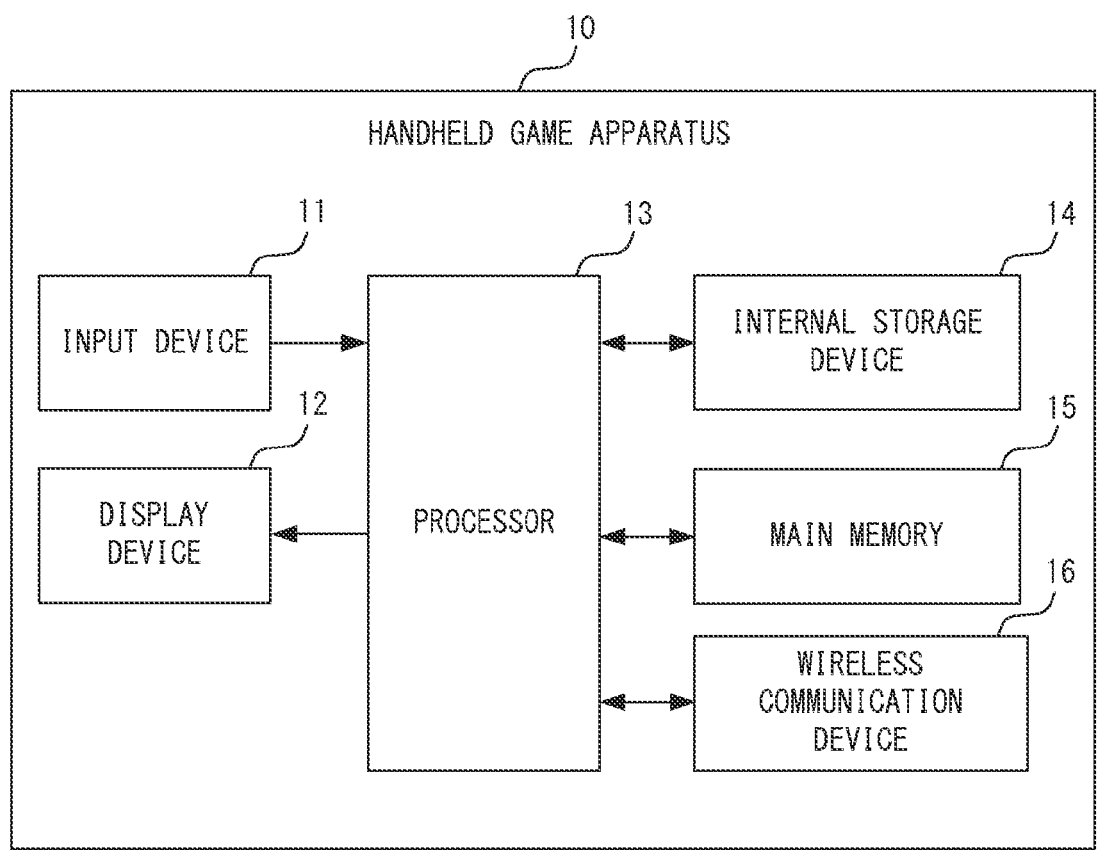
FIG. 1 is a block diagram showing a non-limiting example of a configuration of a handheld game apparatus 10.

In FIG. 1, a handheld game apparatus 10 includes an input device 11, a display device 12, a processor 13, an internal storage device 14, a main memory 15, and a wireless communication device 16.

The input device 11 is operated by a user of the handheld game apparatus 10 and outputs a signal corresponding to the operation performed by the user. The input device 11 is, for example, a cross switch, a push button, or a touch panel. The display device 12 displays, on a screen, an image generated by the handheld game apparatus 10. The display device 12 is typically a liquid crystal display. A computer program to be executed by the processor 13 is stored in the internal storage device 14. The internal storage device 14 is typically a flash EEPROM. Instead of the internal storage device 14, a detachable storage medium (e.g., memory card) may be used. In the main memory 15, computer programs and information are temporarily stored. The wireless communication device 16 transmits a signal to another handheld game apparatus and receives a signal from another handheld game apparatus, through wireless communication.

Next, an outline of operations performed by the handheld game apparatus 10 according to the present embodiment will be described. In the present embodiment, for example, a trading card game as an example game will be described. More specifically, a situation will be described where an operation of organizing redundant cards among trading cards owned by a player (in a game) or an operation of forming a deck is performed. In the present embodiment, as an operation performed in such a situation, an operation of moving cards by dragging them on a touch panel will be used.

FIG. 2 is an example of a game screen assumed in the present embodiment. In FIG. 2, four types of card images 101a to 101d arranged in a lateral direction are displayed. Here, although each card on the screen is displayed as an image of one card, each card is treated as a set (card stack) of identical (redundant) cards, internally. Hereinafter, card images 101a to 101d may be referred to as card stacks 101a to 101d (hereinafter, denoted by a reference numeral "101" as appropriate). It should be noted that the image of each card stack is not limited to a display of an image of one card as above. In another embodiment, the card stack may be displayed, for example, using an image of stacked cards.

In lower left portions of the respective card stacks 101, there are shown numerical values 102a to 102d (hereinafter, denoted by a reference numeral "102" as appropriate) each indicating a total number of cards forming the corresponding card stack. In the example in FIG. 2, a total-number-of-cards 102 of each card stack is 8, 6, 10, and 5, from left to right in this order. In upper right portions of the respective card stacks 101, there are shown numerical values 103a to 103d (hereinafter referred to as a selected card counter, and denoted by a reference numeral "103" as appropriate) each indicating the number of cards selected as a target to be moved through an operation described later. Further, a movement destination area 104 to which cards are moved is displayed in a lower portion of the screen. Here, a situation is assumed in which a card deck is formed by moving cards to the area.

When the user touches any of the card stacks 101 with a stylus pen or the like on such a screen, the user can select a card of the card stack. Then, by performing an operation of dragging the card with the stylus pen to the movement destination area 104 and then performing a touch-off, the user can move the card from the card stack to the movement destination area 104. In the present embodiment, in accordance with an input state caused by the touch operation (touch input) performed on a card stack 101, the number of selected cards in the card stack 101 is changed. Specifically, in accordance with a time period during which the card stack 101 is being touched, the number of selected cards in the card stack 101 can be increased one by one.

Hereinafter, as one exemplary operation, description will be given of a specific exemplary operation of selecting only four cards from the card stack 101a at the left end, which is composed of 8 redundant cards in FIG. 2, and moving the selected four cards to the movement destination area 104. First, on a screen as shown in FIG. 2, the user touches the card stack 101a with a stylus pen. As a result, the state of the screen changes into that as shown in FIG. 3. At this time point, one card from the card stack 101a enters a selected state (in FIG. 3, the selected card stack 101a is highlighted with a thick frame).

Figure 4:
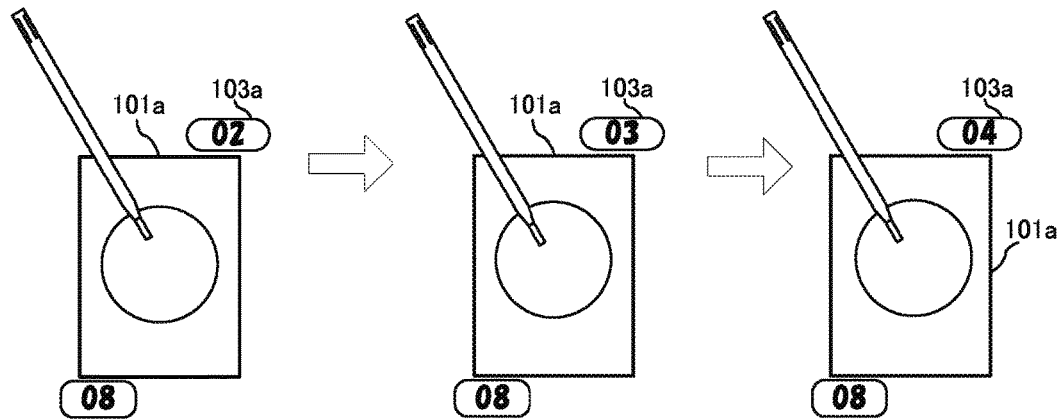
FIG. 4 shows a non-limiting example of an outline of processing of the present embodiment.

After the user has touched the screen in this manner (in the state of FIG. 3), if the user does not perform an drag operation immediately thereafter and continues the touch, the selected card counter 103 at the upper right is incremented one by one every predetermined time period as shown in FIG. 4. That is, every time a certain time period elapses (for example, every 1 second) while the touch is continuously performed, the number of cards selected as a target to be moved can be increased one by one (note that when a drag operation is performed immediately after the card stack is touched, only one card is selected as the target to be moved.)

Figure 5:
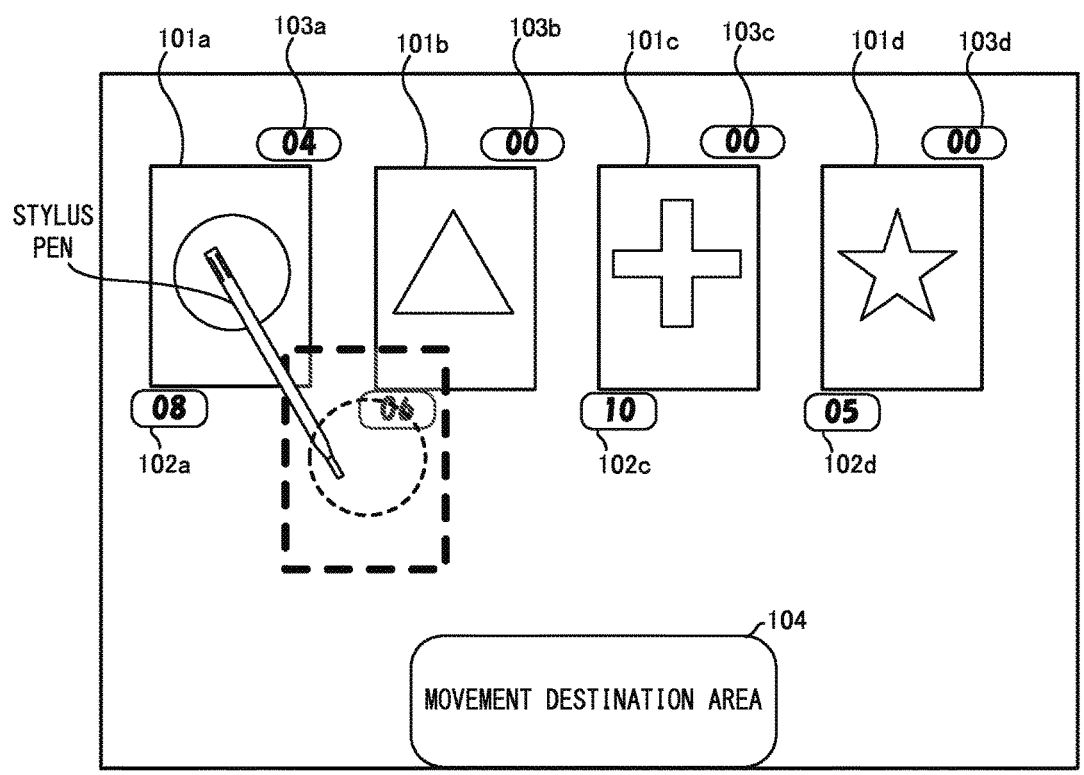
FIG. 5 shows a non-limiting example of an outline of processing of the present embodiment.
Figure 6:
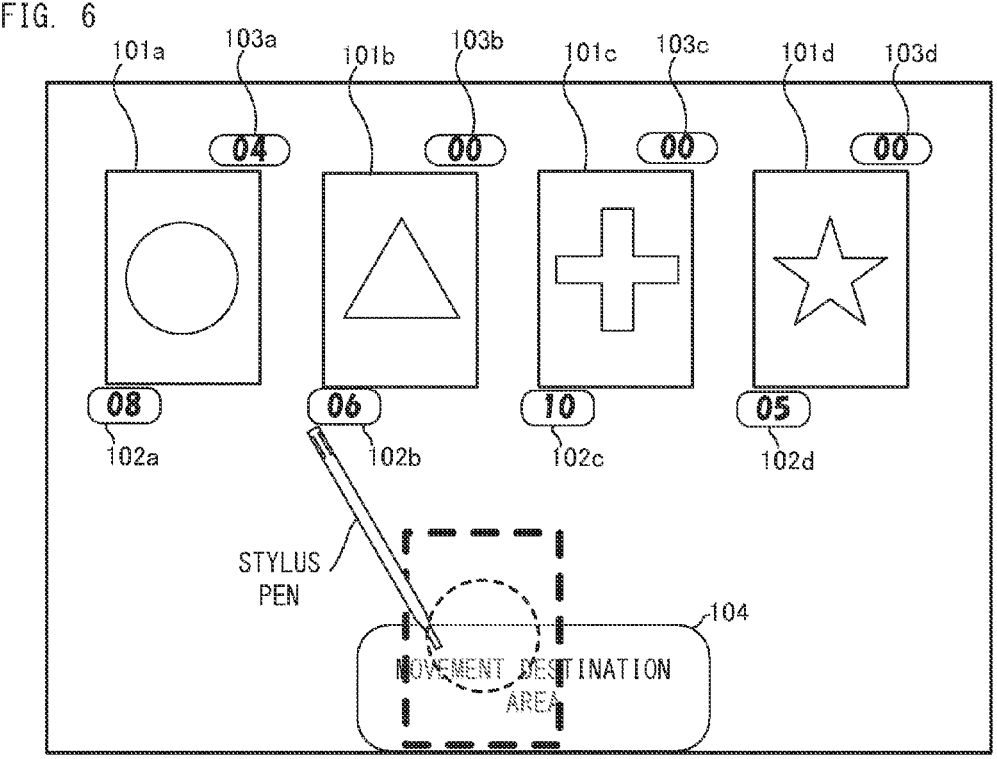
FIG. 6 shows a non-limiting example of an outline of processing of the present embodiment.
Figure 7:
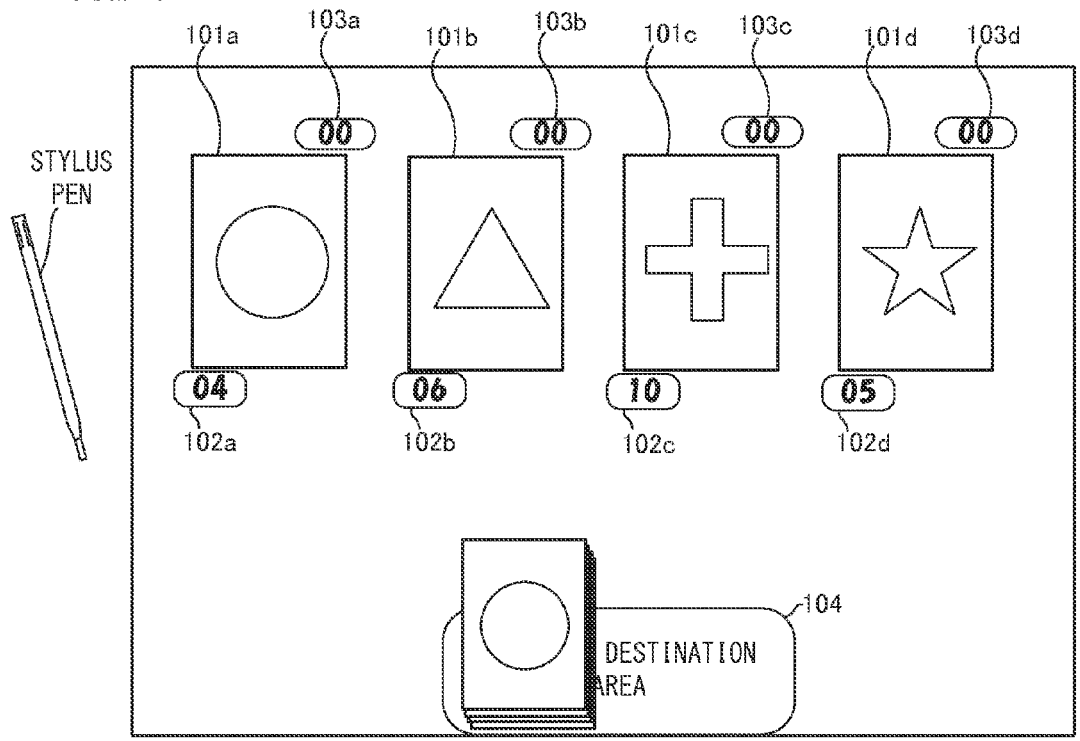
FIG. 7 shows a non-limiting example of an outline of processing of the present embodiment.

Then, when the number of selected cards has become 4 after the touch was continuously performed as described above, a drag operation is performed toward the movement destination area 104 (note that the card image while being moved is displayed in a semi-transparent manner in the present embodiment) as shown in FIG. 5 to FIG. 6. Then, a touch-off is performed in a state shown in FIG. 6. Accordingly, as shown in FIG. 7, four cards can be moved from the card stack 101a to the movement destination area 104. As a result, the total-number-of-cards 102a of the card stack 101a is reduced from "8" to "4". Further, the four cards which have been moved to the movement destination area 104 are incorporated into a predetermined card deck. Instead of this moving process, another predetermined process may be performed. For example, a process such as deleting cards that have been moved to the movement destination area 104 (that is, selected cards) may be performed.

As described above, in the present embodiment, operations of selecting a plurality of cards and moving them, that is, touch-on→adjustment of the number of selected cards (through continuation of touch)→moving of the selected cards (through drag operation), can be realized by a series of operation. Accordingly, for example, compared to an operation of moving cards one by one through repeated touch and drag operations, a highly convenient operation can be provided.

In the above example, the number of selected cards is indicated in the form of the selected card counter 103 shown at the upper right of the card stack. However, presentation of information indicating the number of selected cards is not limited to such a form. For example, as shown in FIG. 8, the cards may be displayed so as to overlie one another in the depth direction, or the card may be displayed so as to be stacked upward. That is, as long as information indicating the number of selected cards is displayed near the card stack, any form may be employed. By showing information indicating the number of selected cards (selection state) near the card stack 101, the space of the screen can be effectively used, compared with, for example, a case of performing an operation of increasing the number of selected targets by enlarging the selected area through a drag operation. For example, in the above example, four types of card stacks can be displayed on one screen, and the selecting operation through the moving operation can be performed on each of these four types of card stacks. Thus, an effective use of the space of the screen has been realized.

It is understood that in another embodiment, not less than four types, or not more than four types of cards may be displayed on one screen. Further, the arrangement of the cards is not limited to the arrangement in the lateral direction as shown in FIG. 2, and the card may be arranged in the longitudinal direction.

Next, with reference to FIG. 10 and FIG. 11, operations performed by the handheld game apparatus 10 will be described in more detail.

Figure 10:
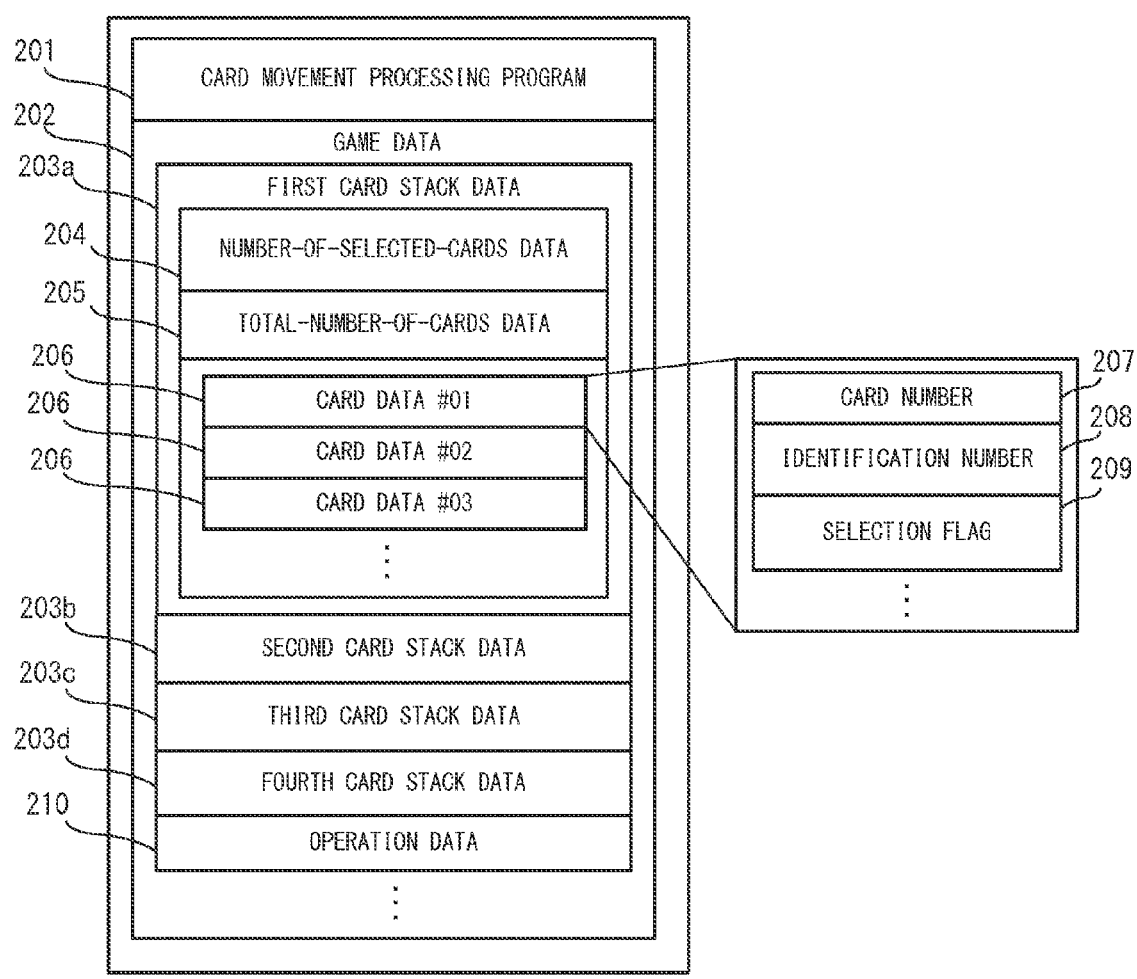
FIG. 10 shows a non-limiting example of a program and information stored in a main memory.

FIG. 10 shows an example of a program and data stored in the main memory 15 of the handheld game apparatus 10. A card movement processing program 201 and game data 202 are stored in the main memory 15.

The card movement processing program 201 is a program for performing processes regarding selection and movement of cards as described above. The game data 202 is various types of data used in such processes, and includes a first card stack data 203a, a second card stack data 203b, a third card stack data 203c, a fourth card stack data 203d, and an operation data 210. In addition, although not shown, various types of data necessary for the above processes are included in the game data 202.

The first card stack data 203a is data corresponding to the card stack 101a in FIG. 2, the second card stack data 203b is data corresponding to the card stack 101b, the third card stack data 203c is data corresponding to the card stack 101c, and the fourth card stack data 203d is data corresponding to the card stack 101d. Hereinafter, these may be collectively referred to as card stack data 203.

The first card stack data 203a is composed of number-of-selected-cards data 204, total-number-of-cards data 205, and one or more pieces of card data 206. The number-of-selected-cards data 204 is data indicating the number of card currently selected in the card stack, and corresponds to the selected card counter 103. The total-number-of-cards data 205 is data indicating a total number of cards forming the card stack, and corresponds to the total-number-of-cards 102.

Card data 206 is data corresponding to each card forming the card stack (for example, in the state of the card stack 101a shown in FIG. 2, there are eight pieces of card data 206). Each card data 206 is composed of a card number 207, an identification number 208, a selection flag 209, and the like. The card number 207 is a value indicating the type of the card. In the present embodiment, one card stack is composed of cards having an identical card number 207. The identification number 208 is a value for identifying each of the redundant cards. For example, in the example in FIG. 2 where four types of cards are shown, the card stack 101a at the left end includes eight cards whose card number is "1", for example, and in order to identify each of the eight cards, identification numbers "1" to "8" are allocated to the eight cards, respectively. Thus, in the present embodiment, each card is identified by a combination of the card number 207 and the identification number 208. For example, each card is identified as "1-1", "1-2", "2-1", or "3-1", in the format of "card number-identification number".

The selection flag 209 is a flag for showing whether the card is in the "selected state". When the flag is ON, it indicates that the card is in the selected state.

Since the data structure of each of the second card stack data 203b, the third card stack data 203c, and the fourth card stack data 203d is the same as that of the first card stack data 203a, description thereof will be omitted.

It should be noted that the structure of the card stack data 203 is not limited to the above structure, and for example, the following structure may be employed. That is, when a card stack is composed of redundant cards, for example, the card stack data 203 may be composed of the number-of-selected-cards data 204, the total-number-of-cards data 205, and the card data 206 (one piece), and the selection flag 209 are provided, where the card data 206 includes only the card number 207. In this case, the selection flag 209 may be controlled so as to be ON when the number-of-selected-cards data 204 is 1 or greater (when at least one card is selected), and to be OFF when the number-of-selected-cards data 204 is 0.

The operation data 210 is data for indicating a content of an input performed onto the input device 11 by the user. For example, the operation data 210 includes pieces of data indicating a contact state and touch coordinates on the touch panel, and pressed states of various types of buttons.

Next, with reference to a flow chart shown in FIG. 11, a flow of a card moving process performed by the processor 13 of the handheld game apparatus 10 will be described. It should be noted that this process is one process included in a predetermined trading card game, and is performed, for example, when a "deck creation screen" is selected from a menu of the game. Here, description will be given only of processes that are relevant to operations of selecting cards through moving them, and description of the other processes will be omitted. Processes of the flow chart shown in FIG. 11 will be repeatedly performed per frame.

First, upon execution of the card movement processing program 201, in step S1, it is determined whether the user is touching the touch panel, with reference to the operation data 210. When it has been determined that the user is not touching the touch panel (NO in step S1), it is determined, in step S2, whether the input state corresponds to a touch-off. When it was determined that the user was in contact with the touch panel in the processing in the immediately-preceding frame and it has been determined that the user is not in contact with the touch panel in the processing in the current frame, it is determined that the input state corresponds to a touch-off. When it was determined that user was not in contact with the touch panel also in the immediately-preceding frame, it is determined that the input state does not correspond to a touch-off.

When it has been determined that the input state does not correspond to a touch-off (NO in step S2), the processing is advanced to step S7 described below. On the other hand, when it has been determined that the input state corresponds to a touch-off (YES in step S2), it is determined, in step S3, whether there is at least one card that is currently selected. This is determined, for example, whether there is card data 206 whose selection flag 209 is set to be ON. As a result of this determination, when there is no selected card (NO in step S3), the processing is advanced to step S7 described below. When there is at least one selected card (YES in step S3), it is determined, in step S4, whether the touch-off position is included in the range of the movement destination area 104. When it is included in that range (YES in step S4), a process for moving the at least one selected card (card whose selection flag 209 is set to be ON) is performed. That is, a process is performed of copying card data 206 of the at least one selected card into, for example, a predetermined card deck storage area (not shown), and deleting the card data 206 from the card stack data 203 to which it belongs. Further, a process is performed of setting the number-of-selected-cards data 204 to "0" and subtracting the number of the at least one card that has been moved, from the total-number-of-cards data 205. In addition to this, a process of displaying the at least one selected card so as to overlap the movement destination area 104 (see FIG. 7) may be performed. It should be noted that the process of this step is not limited to the process of moving card(s) to a card deck, and in another embodiment, another predetermined process (deletion of cards, etc.) may be performed.

On the other hand, when the touch-off position is not included in the range of the movement destination area 104 (NO in step S4), the process of step S5 is skipped.

Next, step S6, the selected state of card(s) is canceled. Specifically, a process of setting the selection flag 209 of each piece of card data to OFF is performed. Further, the value of the number-of-selected-cards data 204 is reset to 0.

Next, in step S7, a process of rendering a screen reflecting the above processes is performed. Then, this processing ends.

Next, description will be given of a process performed when it has been determined that the user is touching the touch panel (YES in step S1) as a result of the determination in step S1. In this case, first, in step S8, it is determined whether the user was touching the touch panel also in the processing in the immediately-preceding frame. That is, it is determined whether the input state corresponds to a touch-on or a touch being continuously performed. As a result, when the user was not touching the touch panel in the immediately-preceding frame (NO in step S8), the input state corresponds to a touch-on. At this time, in step S12, the operation data 210 is referred to. When the touch position is included in any of images of the card stacks 101a to 101d (that is, a touch-on is performed on any of the card stacks), the selection flag 209 of a card having a smallest identification number 208, among cards forming the touched card stack 101, is set to be ON, thereby setting that card in a selected state (for example, the card data 206 corresponding to "1-1" is selected). Further, 1 is added to the number-of-selected-cards data 204 (hereinafter this process will be referred to as an increment process). At this time, a process of highlighting the image of the selected card stack is also performed. Then, the processing is advanced to the rendering process of step S7 described above, and a screen reflecting the content of the process is rendered. It should be noted that unless the touch position is included in the image of a card stack, the above process is not performed in step S12, and the processing is advanced to the next process.

On the other hand, when the user was touching the touch panel also in the immediately-preceding frame (YES in step S8), the user is still in a state of touching the touch panel, and thus, in step S9, it is determined whether the touch position is within or near the image of the selected card stack 101, and whether a predetermined time period has elapsed since the immediately-preceding increment process. It should be noted that the position near the selected card is, for example, a position within an area slightly larger than the card image.

As a result of the above determination, when the touch position is within or near the card image and the predetermined time period has elapsed since the immediately-preceding increment (YES in step S9), then, in step S10, a increment process of the number of selected cards is performed. That is, the next card is selected, in an ascending order, from among the cards forming the selected card stack, the selection flag 209 of that card is set to be ON, and the number-of-selected-cards data 204 is incremented.

On the other hand, when the condition of step S9 is not satisfied (NO in step S9), the process of step S10 is skipped, and the processing is advanced to step S11. For example, as a result of a drag operation, when the touch position is separated by a certain distance from the image of the selected card stack, increment of the number of selected cards is stopped although the selected state of the card is maintained. In other words, only when the touch position is within a predetermined area, increment of the number of selected cards is performed, and when the touch position is outside the predetermined area, increment of number of selected cards is stopped.

Next, in step S11, when there is at least one selected card and the touch position is within a card movable range, a process of moving the at least one selected card to the position (coordinates) of the touch. At this time, the card(s) being moved may be displayed in a semi-transparent manner for easier recognition (for example, see FIG. 5, etc.) or may not be displayed in a transparent manner in particular. Alternatively, an image of the entirety of the selected card stack being moved may be displayed, or an image of a card being moved may be displayed, separately from the image of the card stack, as shown in FIG. 5. Further, the selected card counter 103 may be displayed near the card being moved (in other words, the selected card counter 103 may also be moved so as to follow the card being moved.) Further, both of the selected card counter 103 and the total-number-of-cards 102 may be displayed near the card being moved. It should be noted that, although the card movable range is not limited in particular, an area that is not included in the image of a card stack (any one of selected and not-selected card stacks) and is not included in the image of the movement destination area 104 may be set as the card movable range, for example.

Then, the processing is advanced to step S7, and a screen is rendered that reflects the increments and the card movement state described above. Now, description of the card moving process of the present embodiment is completed.

As described above, in the present embodiment, when the user performs a touch-on onto on an image of a card stack and continues to touch the image, the number of selected cards of that stack can be increased, and if the user performs a drag operation directly thereafter, the selected cards can be moved. That is, processes such as selecting a plurality of cards and moving them can be realized through a series of operations, and the user can also control the number of selected cards in the series of operations. This makes it possible to provide the user with intuitive and comfortable operability when performing processes such as selecting a plurality of objects such as cards, and moving them. Further, since the number of selected cards (selection state) is displayed near the card stack, the space of the screen can also be effectively used.

[Modification]

In the above embodiment, with respect to the timing of performing the card moving process, movement of cards is performed at a time point when a touch-off is performed by the user after the cards had been dragged to the movement destination area 104. However, in another embodiment, cards may be moved at the time point when the cards are dragged into the movement destination area 104 (without waiting a touch-off).

Further, in the case of moving cards through a drag operation, for example, when a drag operation of returning the cards to their original card stack is performed before reaching the movement destination area 104, increment may be continued from the number of cards selected before that time point. Alternatively, in such a case, increment may not be performed. (That is, if selected cards have been separated from the card stack by a predetermined distance through the drag operation, the number of selected cards may be fixed at that time point.)

Further, an incremented number of selected cards may be decremented through a predetermined operation. For example, in the above embodiment, while a touch is continuously performed on (or near) the image of a card stack, the number of selected cards is incremented. However, by performing a touch-off at this position, the number of selected cards may be decremented one by one, to be 0 in the end. Alternatively, by pressing a predetermined button (such as A button) while a touch is continuously performed, the number of selected cards may be decremented one by one (while the A button is being pressed, the number of selected cards is decremented one by one).

Further, in the above embodiment, an example in which the number of selected cards is changed one by one. However, the present embodiment is not limited thereto. The number of selected cards may be incremented by two, or by three. That is, the unit number of such change is not limited to one.

Figure 12A:
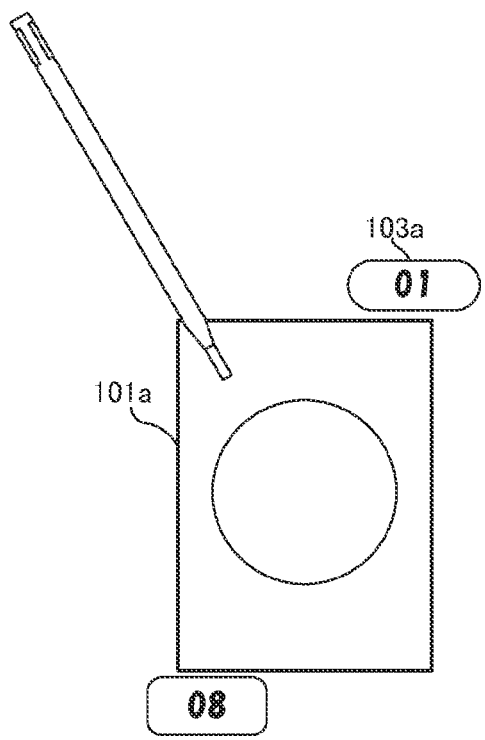
FIG. 12A shows another non-limiting example of a selection number changing operation.
Figure 12B:
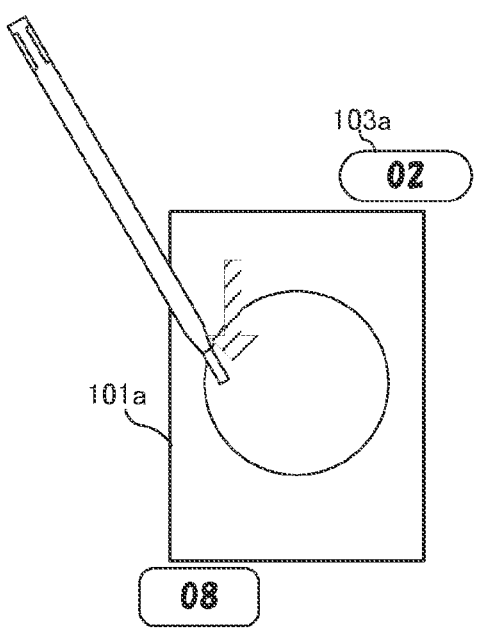
FIG. 12B shows another non-limiting example of a selection number changing operation.
Figure 12C:
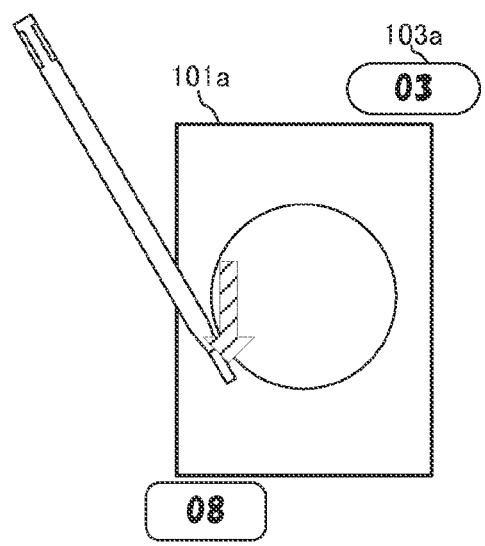
FIG. 12C shows another non-limiting example of a selection number changing operation.
Figure 12D:
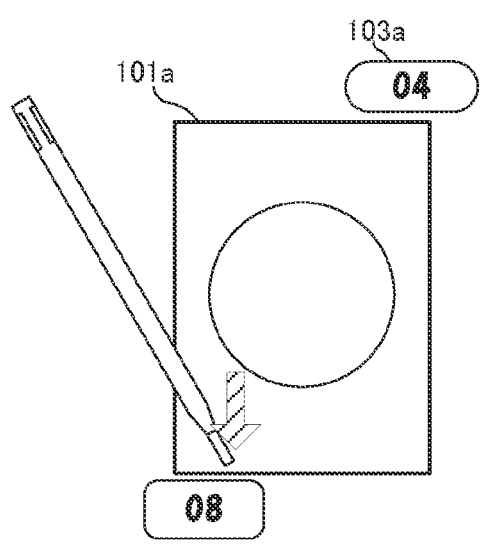
FIG. 12D shows another non-limiting example of a selection number changing operation.

Further, also with respect to the operation of changing the number of selected cards, instead of the operation of continuing the touch as described above, the following operation may be employed to change the number of selected cards. For example, by performing a drag operation within the image of a card stack, the number of selected cards may be changed in accordance with the distance along which the drag operation has been performed and the speed of the drag operation. Now, an example of such an operation will be described, using FIG. 12A to FIG. 12D. For example, as shown in FIG. 12A, an upper portion of the image of a card stack is touched at first (one card is selected). Then, as shown in the flow of FIG. 12B→FIG. 12C→FIG. 12D, by shifting the touch position downwardly, the number of selected cards may be incremented one by one in accordance with the moved distance. Further, the unit of changing the number of selected cards may be changed in accordance with the moving speed at that time. For example, when the operation as shown in FIG. 12A to FIG. 12D is performed at a slow speed, the number of selected cards may be incremented one by one, and when the same operation is performed at a certain high speed, the number of selected cards may be incremented by two or by three (as a result, the number of selected cards becomes 8 in the state of FIG. 12D, for example).

Further, in a state where four cards are selected from the card stack 101a having eight cards as shown in FIG. 6, the display of the total-number-of-cards 102a may be changed from "8" to "4" (that is, the number of cards that are not selected). In other words, a display may be employed in which a total of the value indicated by the total-number-of-cards 102 and the value indicated by the selected card counter 103 is always constant (until movement is completed).

Further, as another operation example, for example, a pressure sensor is installed on the handheld game apparatus 10 so as to be able to detect a pressing force applied on the touch panel, and the number of selected cards may be changed in accordance with the pressing force. For example, the number of selected cards is not changed with a light touch, and the number of selected cards may be incremented when the touch panel is pressed strongly to some extent.

Further, in the above embodiment, an operation example using a touch panel has been described. However, the input device is not limited thereto. Even when a pointing device such as a mouse is used, the above processing is applicable.

Further, the above processing is not limited to game processing. It is understood that the above processing is generally applicable to information processing which uses operations such as selecting a plurality of predetermined objects and performing a predetermined process on the selected objects.

Figure 11:
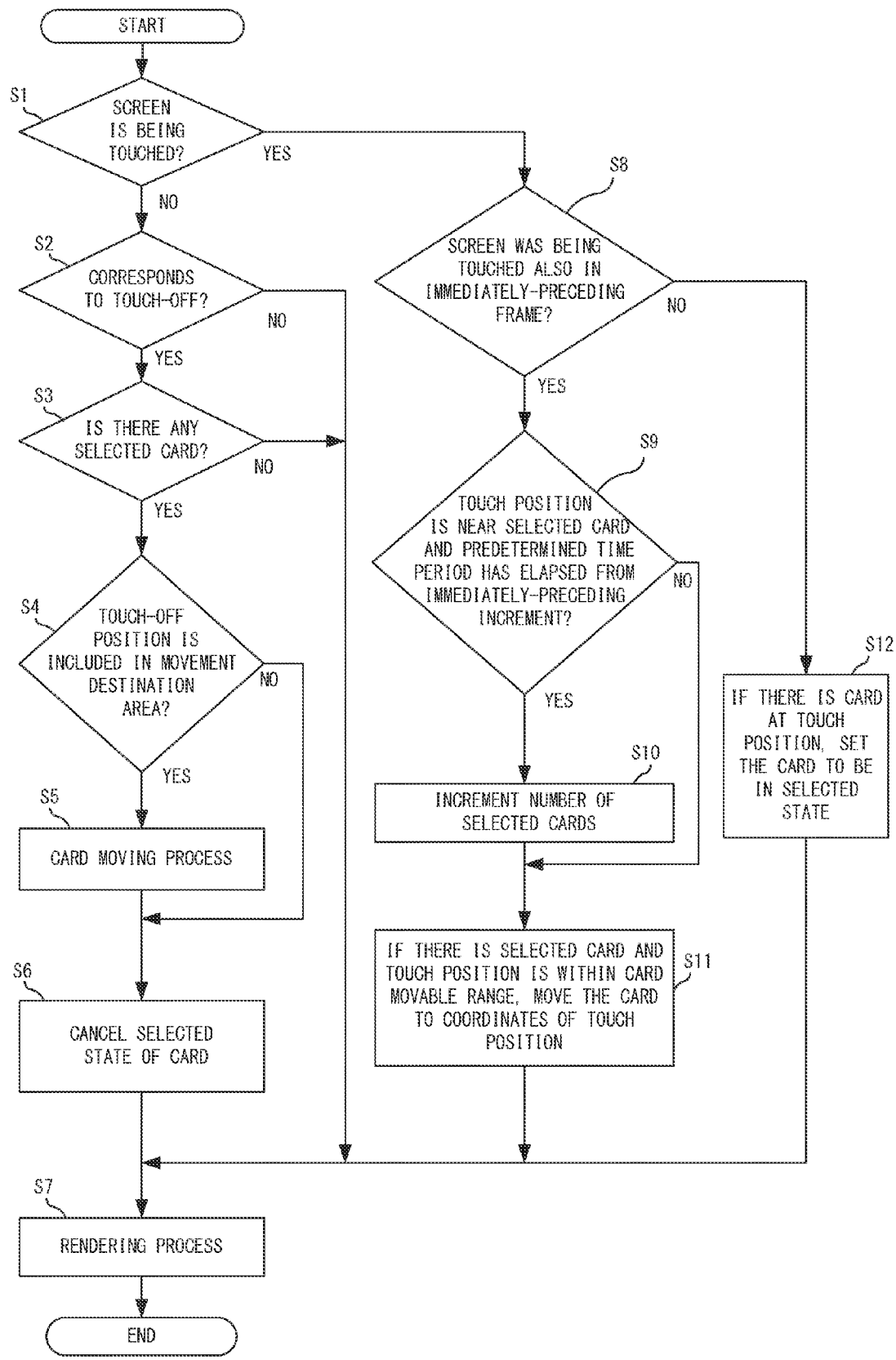
FIG. 11 is a flow chart of a non-limiting example of processing performed by a processor.

Further, in the above embodiment, the plurality of processes shown in FIG. 11 is performed by one information processing apparatus (the handheld game apparatus 10). However, in another embodiment, the plurality of processes may be shared by a plurality of information processing apparatuses (such as the handheld game apparatus 10 and a server apparatus). Further, the plurality of processes shown in FIG. 11 may be performed by one computer (the processor 13), or may be shared by a plurality of computers. Still further, a part or the whole of the plurality of processes may be realized by a dedicated circuit.

Further, in the above embodiment, an example of a handheld game apparatus has been described. However, the present embodiment is not limited thereto. The above processing is applicable to handheld information terminals, tablet terminals, and personal computers, and the like that are communicable with another information processing apparatus.

What is claimed is:

1. A computer-readable non-transitory storage medium having stored therein an information processing program that, when executed, causes a computer of an information processing apparatus including a touch panel display, to at least:
    display, on the touch panel display, a plurality of objects, wherein one or more of the displayed objects are displayed in a non-overlapping manner and identical ones of the displayed objects are displayed in an overlapping manner;
    in response to a touch input on the touch panel display, detect a touch-on position on the touch panel display;
    determine whether the detected touch-on position designates an object from the plurality of objects displayed on the touch panel display;
    select the designated object when it is determined that the detected touch-on position designates the object;
    after the designation of the designated object, detect a time duration of the touch input, change in position of the touch input on the touch panel display, and a touch-off position of the touch input;
    when the designated object is an object displayed on the touch panel display in the overlapping manner, (1) change, in accordance with the detected time duration of the touch input within a predetermined area that includes a portion of the touch panel display outside of the designated object on the touch panel display, a number of selected objects by including or excluding identical objects overlapped by the selected object in the selection, and (2) stop changing the number of selected objects when the detected position of the touch input is outside of the predetermined area, and
    when the touch-off position of the touch input is performed outside of the predetermined area, perform a process on the selected objects.

2. The computer-readable non-transitory storage medium having stored therein the information processing program according to claim 1, wherein
    the number of the selected identical objects is increased in accordance with an increase in the time duration of the touch input within the predetermined area.

3. The computer-readable non-transitory storage medium having stored therein the information processing program according to claim 1, wherein
    the number of selected identical objects is repeatedly changed while the designated position is included in the predetermined area.

4. The computer-readable non-transitory storage medium having stored therein the information processing program according to claim 1, the information processing program, when executed, further causing the computer to:
    determine whether the touch-off position of the touch input is performed in a predetermined movement destination area, and
    when it is determined that the touch-off position of the touch input is performed in the predetermined movement destination area, move the selected objects to the movement destination area.

5. The computer-readable non-transitory storage medium having stored therein the information processing program according to claim 1, the information processing program, when executed, further causing the computer to:
    display information indicating the number of the selected objects.

6. The computer-readable non-transitory storage medium having stored therein the information processing program according to claim 5, wherein
    the information indicating the number of the selected objects is displayed near the selected object.

7. The computer-readable non-transitory storage medium having stored therein the information processing program according to claim 1, the information processing program, when executed, further causing the computer to:
    arrange, among the displayed objects, objects that are not identical, along a longitudinal and/or lateral direction of the touch panel display, wherein
    determining whether the designation of the object has been performed includes determining whether a designation of objects has been performed by selecting the displayed objects from among the objects arranged along the longitudinal and/or lateral direction.

8. The computer-readable no-transitory storage medium having stored therein the information processing program according to claim 1, wherein the number of the selected identical objects is incremented in accordance with a duration of the touch input within the predetermined area, and the number of selected identical objects is decremented in accordance with the duration of the touch input within the predetermined area when another input is provided during the touch input within the predetermined area.

9. An information processing apparatus comprising a processing system including at least one processor, the processing system being configured to at least:
   display, on touch panel display, a plurality of objects, wherein one or more of the displayed objects are displayed in a non-overlapping manner and identical ones of the displayed objects are displayed in an overlapping manner;
   in response to a touch input on the touch panel display, detect a touch-on position on the touch panel display;
   determine whether the detected touch-on position designates an object from the plurality of objects displayed on the touch panel display;
   select the designated object when it is determined that the detected touch-on position designates the object;
   after the designation of the designated object, detect a time duration of the touch input, change in position of the touch input on the touch panel display, and a touch-off position of the touch input;
   when the designated object is an object displayed on the touch panel display in the overlapping manner, (1) change, in accordance with the detected time duration of the touch input within a predetermined area that includes a portion of the touch panel display outside of the designated object on the touch panel display, a number of selected objects by including or excluding identical objects overlapped by the selected object in the selection, and (2) stop changing the number of selected objects when the detected position of the touch input is outside of the predetermined area; and
   when the touch-off position of the touch input is performed outside of the predetermined area, perform a process on the selected objects.

10. The information processing apparatus according to claim 9, wherein the number of the selected identical objects is incremented in accordance with a duration of the touch input within the predetermined area, and the number of selected identical objects is decremented in accordance with the duration of the touch input within the predetermined area when another input is provided during the touch input within the predetermined area.

11. The information processing apparatus according to claim 9, wherein the plurality of displayed objects on the touch panel display includes a plurality of groups of objects, each group including identical objects that are displayed in an overlapping manner and that are different from the objects included in the other groups.

12. The information processing apparatus according to claim 9, wherein the processing system is further configured to detect a drag operation within the selected object and the number of selected identical objects is changed in accordance with the distance along which the drag operation is performed.

13. The information processing apparatus according to claim 12, wherein a rate at which the number of selected identical objects is changed is determined based on a moving speed of the drag operation.

14. The information processing apparatus according to claim 9, wherein the process includes moving the selected objects across the touch panel display and removing the selected objects from being displayed on the touch panel display.

15. An information processing system comprising:
   a touch panel display;
   an input device; and
   processing circuitry, coupled to the touch panel display and the input device the processing circuitry configured to at least:
      display, on the touch panel display, a plurality of objects, wherein one or more of the displayed objects are displayed in a non-overlapping manner and identical ones of the displayed objects are displayed in an overlapping manner;
      in response to a touch input on the touch panel display, detect a position on the touch panel display corresponding to the touch-on of the touch input;
      determine whether the detected touch-on position designates an object from the plurality of objects displayed on the display;
      select the designated object when it is determined that the detected touch-on position designates the object;
      after the designation of the designated object, detect a time duration of the touch input, change in position of the touch input on the touch panel display, and a touch-off position of the touch input;
      when the designated object is an object displayed on the touch panel display in the overlapping manner, (1) change, in accordance with the detected time duration of the touch input within a predetermined area that includes a portion of the touch panel display outside of the designated object on the touch panel display, a number of selected objects by including or excluding identical objects overlapped by the selected object in the selection, and (2) stop changing the number of selected objects when the detected position of the touch input is outside of the predetermined area; and
      when the touch-off position of the touch input is performed outside of the predetermined area, perform a process on the selected objects.

16. The information processing system of claim 15, wherein the number of selected identical objects is decremented in accordance with the duration of the touch input when a predetermined input is input by the input device while the touch input is within the predetermined area.

17. An information processing control method used in an information processing apparatus or an information processing system including a touch panel display, the information processing control method comprising the steps of:
   displaying, on the touch panel display, a plurality of objects, wherein one or more of the displayed objects are displayed in a non-overlapping manner and identical ones of the displayed objects are displayed in an overlapping manner;
   in response to a touch input on the touch panel display, detecting a touch-on position on the touch panel display;
   determining whether the detected touch-on position designates an object from the plurality of objects displayed on the touch panel display;
   selecting the designated object when it is determined that detected touch-on position designates the object;
   after the designation of the designated object, detecting a time duration of the touch input, change in position of the touch input on the touch panel display, and a touch-off position of the touch input;

what the designated object is an object displayed on the touch panel display in the overlapping manner, (1) changing, in accordance with the detected time duration of the touch input within a predetermined area that includes a portion of the touch panel display outside of the designated object on the touch panel display, a number of selected objects by including or excluding identical objects overlapped by the selected object in the selection, and (2) stop changing the number of selected objects when the detected position of the touch input is outside of the predetermined area; and when the touch-off position of the touch input is performed outside of the predetermined area, performing a process on the selected objects.

18. An information processing apparatus comprising:

a touch panel display; and a processing system comprising at least one hardware processor, the processing system being configured to at least:

control the touch panel display to display a plurality of overlapping objects, wherein one or more of the displayed objects are displayed in a non-overlapping manner and identical ones of the displayed objects are displayed in an overlapping manner;

in response to a touch input on the touch panel display, detect a touch-on position on the touch panel, when the touch-on position on the touch panel display corresponds to a displayed object overlapping other displayed objects, selecting a first one of the overlapping objects;

in response to a continuation of the touch input within a predetermined area that includes a portion of the touch panel display outside of the designated object on the touch panel display, changing the number of selected ones of overlapping objects based on a duration of the touch input performed on the first selected object;

in response to a drag operation which is a continuation of the input outside of the predetermined area, stop changing the number of selected ones of overlapping objects; and in response to a touch-off operation, performing a collective process on the selected overlapping objects.

19. The information processing apparatus according to claim 18, wherein controlling the touch panel display to display the plurality of overlapping objects includes displaying multiple groups of objects, each group including identical objects displayed in an overlapping manner and each group includes identical objects that are different from the identical objects of any other displayed group.

20. The information processing apparatus according to claim 18, wherein the processing system is further configured to at least:

in response to the drag operation, control the display to display the selected ones of overlapped objects moving on the display in accordance with the movement of the drag operation.

21. The information processing apparatus according to claim 18, wherein the collective process is performed on the selected overlapping objects when the touch-off operation is performed in a designated destination area on the touch panel display.

* * * * *